UNITED STATES PATENT OFFICE.

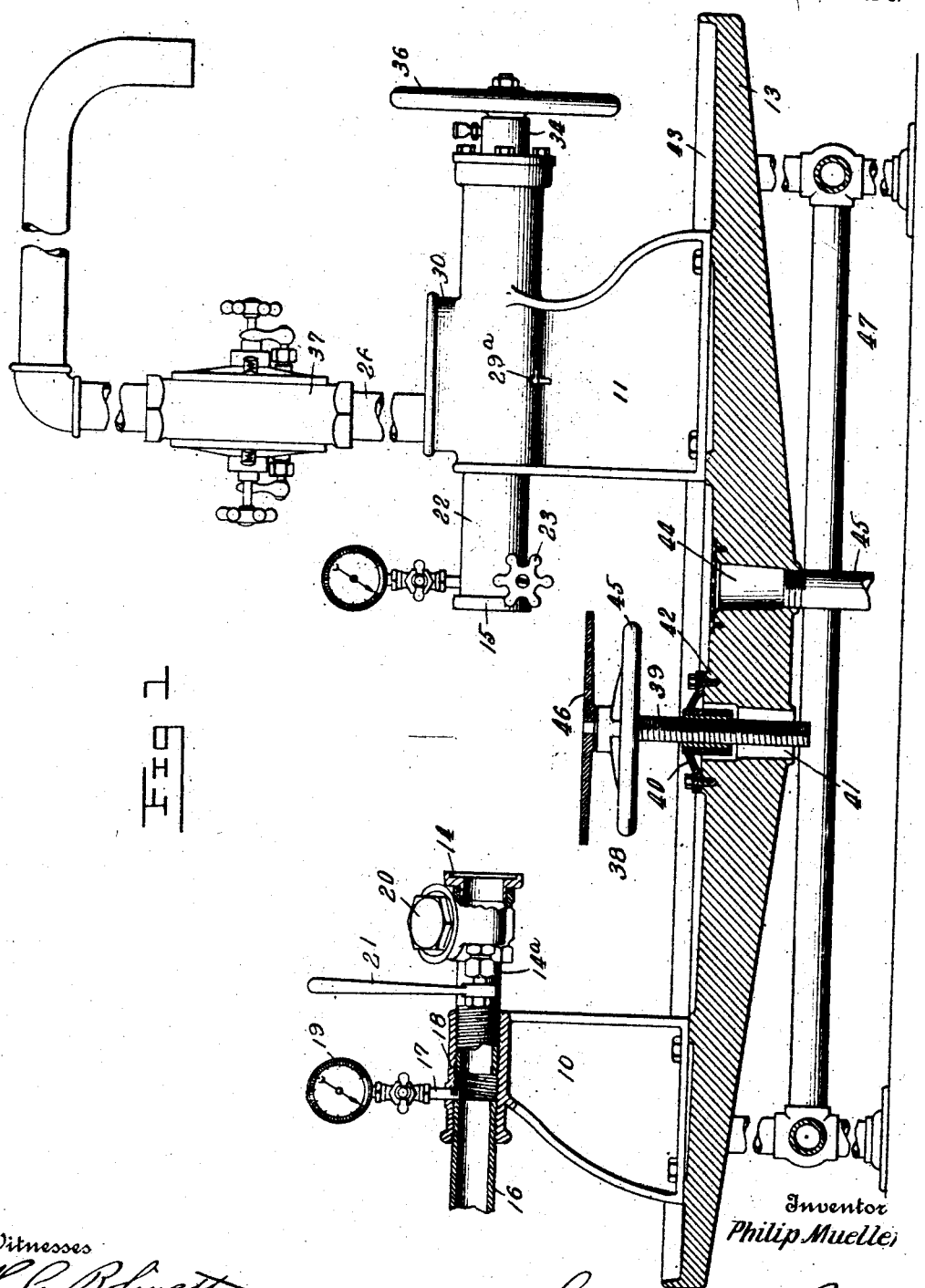

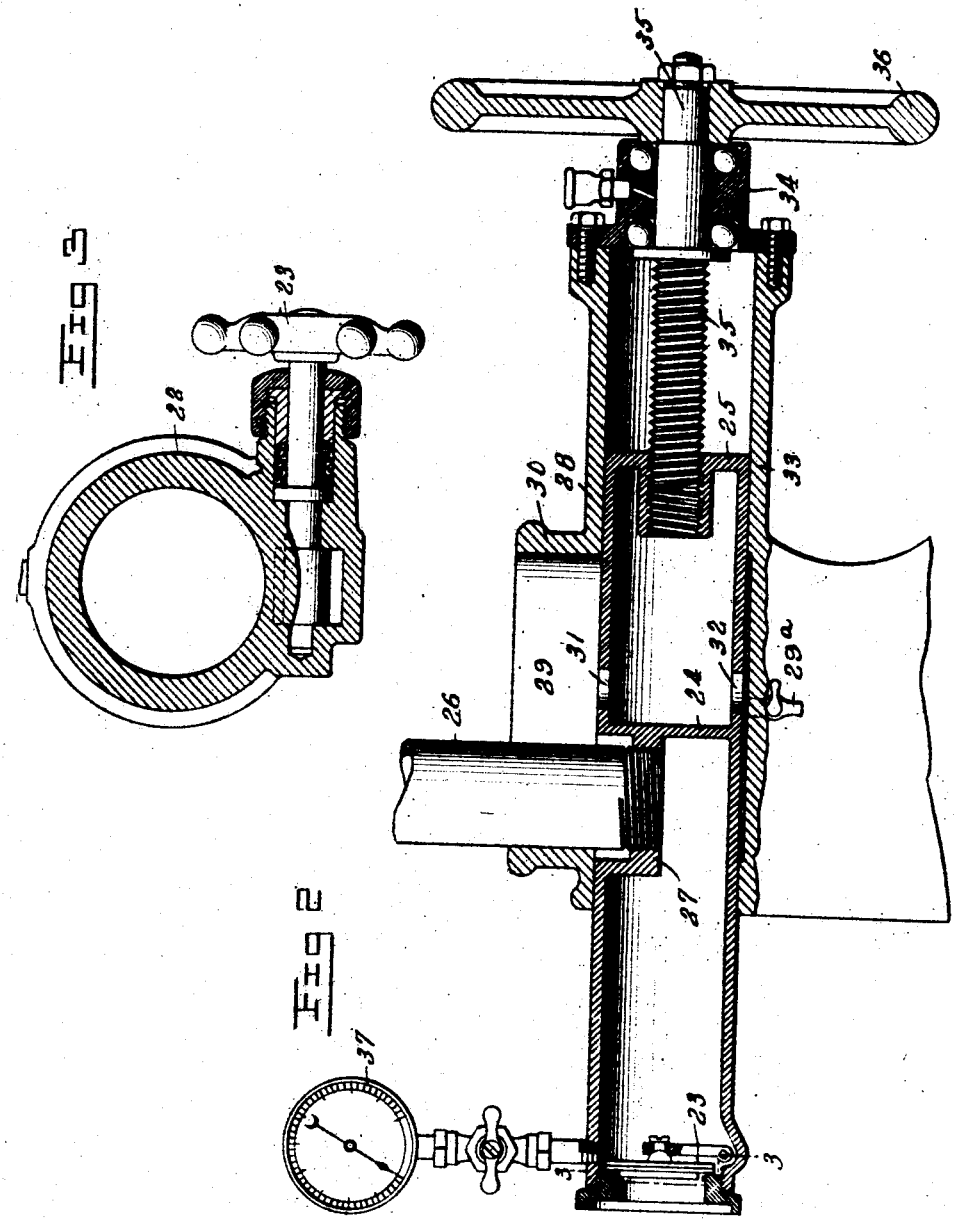

PHILIP MUELLER, OF DECATUR, ILLINOIS, ASSIGNOR TO H. MUELLER MANUFACTURING COMPANY, OF DECATUR, ILLINOIS, A CORPORATION OF ILLINOIS.

FLUID-METER TESTER.

1,038,182.  Specification of Letters Patent.  Patented Sept. 10, 1912.

Application filed December 1, 1910. Serial No. 595,047.

*To all whom it may concern:*

Be it known that I, PHILIP MUELLER, a citizen of the United States, residing at Decatur, in the county of Macon and State of Illinois, have invented new and useful Improvements in Fluid-Meter Testers, of which the following is a specification.

My invention consists of a fluid meter tester. It has particular relation to water meter testers, though it may be used with the same or greater advantage as a gas or other fluid meter tester, dependent upon the conditions of the test.

The meter tester of my invention consists of testing elements organized and combined to the end of producing a tester at once simple and convenient to operate, accurate in its measurements, free from leakage and spilling of water, light and neat in construction, attractive in appearance, and cheap to manufacture. To these ends I have provided novel constructions of various parts; have provided controlling valves and water handling devices; have provided novel means of supporting and connecting the meters to be tested with relation to the preceding members, and have so organized and combined the members with respect to each other and with respect to the work to be done that the testing may be done with great efficiency.

My invention will be more fully understood and its advantages clearly apparent from the following description which is to be taken in connection with the accompanying drawings.

Of the drawings,—Figure 1 is a side elevation of the tester of my invention showing certain parts in section. Fig. 2 is a longitudinal section of one of the head stocks for the meter, and Fig. 3 is a section on the line 3—3 of Fig. 2 showing a detail of the control valve.

The general type of meter to which my invention relates more particularly is that type in which use is made of two stocks mounted opposite each other and carrying the heads through which connections are made with a meter which is supported by some means between the heads. These stocks are numbered 10 and 11 in the drawings. Both of them are centrally bored and bolted to a table 13 a suitable distance apart. The stock 10 carries a head 14 adapted to make connection with the meter to be tested from the supply mains, while the stock 11 carries a somewhat similar head 15 adapted to receive the discharge from the meter and transfer it through the controlling and measuring devices to a suitable weighing or other discharge tank.

The head 14 is connected with or formed as a part of a casting 14ª which casting has formed therewith a valve body 20, the end of said casting being threaded into the bore 18 of the stock 10. A supply pipe 16 is threaded into the other end of the bore. The said casting 14ª projects sufficiently in front of the stock 10 to position the head 14 in proper place. The nipple 17 is screwed into the bore 18 and carries at its upper end the pressure gage 19. Immediately adjacent the head 14 is a quick opening controlling valve 20 provided with an operating lever 21.

The head 15 is supported on the end of an adjustable discharge spindle 22 movably journaled in the stock 11 in axial alinement with the supply pipe 16 so that the heads 14 and 15 lie in parallel planes immediately opposite each other. Immediately adjacent head 15 is a quick acting flop valve 23 which closes toward the head 15 as shown in Figs. 2 and 3. The opposite end of the spindle 22 (see Fig. 2) is closed by two spaced transverse walls 24 and 25. Between the head 15 and the wall 24 the discharge pipe 26 communicates with the interior of the spindle. This discharge pipe is permanently tapped to the spindle, being screw threaded to the inset wall 27 as shown. The upper wall 28 of the bearing of the spindle is provided with an elongated slot 29 through which the discharge pipe 26 passes, and in which it may be moved longitudinally with the spindle. A vertical wall 30 is provided around the edges of the slot for the purpose of guiding the discharge pipe 26 in its movements. Holes 31, 32, are bored through the spindle in the rear of wall 24 to permit the oiling of the parts and also permit drawing of any water that may happen to get in slot 29. Such collected water and oil may be discharged through a suitable pet cock 29ª screwed into the part 11. The end walls 33 of the bearing of the spindle are extended rearwardly beyond the end 25 of the spindle and support by means of a bearing collar 34 bolted thereto an adjusting clamp spindle 35 in screw-threaded engagement with the wall 25 at its inner end, and provided at its outer end with an operating hand wheel 36. The bearing collar 34 is provided with a hollow bearing of such length and dimensions as to give ample bearing surface and permit free turning of the clamp spindle. A pressure gage 37 is tapped into the spindle immediately adjacent and behind the flop valve 23.

In the discharge pipe 26 is a multiple cock of the construction shown and described in Letters Patent No. 1,022,375, granted me April 2, 1912. By means of this cock, the flowing stream in the discharge pipe may be constricted to a circular form of any one of a number of predetermined diameters, and this by the simple turning of the operating handles of the cock in a very simple manner. This cock is permanently in the discharge pipe in the same manner as are the ordinary globe valves connected in series with a line of pipe.

Rising from the table 13 between the heads 14 and 15 is a supporting stand 38. This stand comprises a central post 39 screw-threaded into a supporting collar 40 which covers an opening 41 through the body of the table through which the post 39 projects. The surface of the table 13 is sloped inwardly from its edges as shown in Fig. 1 to a mound 42 surrounding the opening 41, and the collar 40 makes a water tight joint with this mound 42 and its body rises a sufficient distance above it to position its top above the normal water level. This water level is determined by an upwardly extending flange 43 on the edge of the table. A drainage opening 44 passes through the body of the table near the stand 38 and discharge from it is taken by pipe 45. The post 39 supported by the collar 40 is provided with a hand wheel 45 whereby it may be turned to raise the top 46 of the stand to any desired position. The top 46 is rotatably swiveled on the end of the post 39, as clearly shown in Fig. 1.

The entire meter tester is supported on a neat framework of tubing 47 at a height suitable for the convenient manipulation of its various parts.

The operation of the tester of my invention is as follows: A meter of any of the usual sizes within the capacity of the tester is placed upon the stand 46 and properly adjusted and clamped between the heads 14 and 15, all the controlling valves on the supply side of the meter being closed. The meter is then filled with water by opening the valve on the inlet side, a sufficient amount of water being allowed to pass through the meter and out of the discharge pipe to expel all the air in the meter and in the apparatus, and to make sure that everything is in proper working order. As soon as the indicator on the meter is at some convenient point for taking a reading, the inlet valve is closed. Being a quick acting valve, operated by a lever, this closure may be effected to stop the registry of the meter with exactness. The multiple cock in the discharge pipe is then adjusted to constrict the stream of water flowing through the meter to a certain diameter. This done and the scales or other devices for measuring the discharge of water having been placed in position and adjusted, the inlet valve is opened quickly, after noting the reading of the meter, and a certain quantity of water as measured by the meter allowed to pass through the meter, whereupon the inlet valve is quickly closed, the closure being made the instant that the meter shows that the desired amount of water has passed through, exercising care to be accurate. The comparison of the measured quantity of water discharged, the measurement being made on the scales or other devices, with the reading of the meter at once shows the accuracy or inaccuracy of the meter. With specially devised measuring scales for weighing the discharged water this accuracy may be determined exactly in per cent. directly from the scales. Other similar runs of the same meter are made with different sized streams until the meter has been tested through its operating range, whereupon the meter may be readily removed by turning the clamping spindle backwardly. Prior to removing the meter the flop valve adjacent the head 15 is closed, and spillage of water from the discharge pipe is thus prevented. The flop valve is held closed by the column of water in the discharge pipe. By virtue of the position of the inlet and outlet valves 20 and 23 immediately adjacent the heads 14 and 15 wastage of water is prevented, and time incident to the filling of connections is saved. All connections must be filled before a test is made, and when already filled time is saved. Slopping of water is also effectually prevented. All spillage and leakage incident to the connection and disconnection of the meter is caught by the table, and finds its way to a suitable drain through the drain pipe communicating with the central portion of the table.

While I have described the best form of my invention now known to me, I desire to have it understood that I do not wish to be limited to this specific form, since my invention may be given many specific forms by those skilled in the art without departing in anywise from its generic spirit.

What I claim is:—

1. A meter tester comprising a table, two heads supported on said table, one of said heads being movable toward and from the other, means for so moving said head, a supply pipe to one head, and a discharge leading from the other head, a water retaining wall around the sides of said table, means for supporting a meter between said heads and in connection therewith, said means comprising an upright member passing through the body of the table, and a mound surrounding said member and rising from the table a height substantially equal the height of said retaining wall.

2. A meter tester comprising a table having a retaining wall at its edge, two heads supported on said table, one of said heads being movable toward and from the other, means for so moving said head, a supply pipe to one head, and a discharge leading from the other head, means for supporting a meter between said heads and in connection therewith, said means comprising an upright member passing through the body of the table, and a collar surrounding said member and making a water tight joint with the table, said collar being of a height substantially equal to the height of said retaining wall.

3. A meter tester comprising a table, two heads supported on said table, one of said heads being movable toward and from the other, means for so moving said head, a supply pipe to one head, and a discharge leading from the other head, means for supporting a meter between said heads and in connection therewith, said means comprising an upright member passing through the body of the table, and a flanged collar supporting said member, the flange of said collar being of a height substantially equal to the top of said retaining wall.

4. A meter tester comprising a frame, spaced stocks on the frame, a supply pipe leading to one of the stocks, a discharge pipe leading from the opposite stock, a casting extending inwardly from one stock and having at its inner end a valve casing, a valve in the casing controlling the flow of fluid therethrough, a head on the inner end of the valve casing, a spindle extending inwardly from the opposite stock and having a second valve casing at its inner end, a valve in said second valve casing controlling the flow of fluid therethrough, a second head on the inner end of the second valve casing, and a meter support on the frame between the heads adapted to support the meter connected to the heads.

5. A meter tester comprising a frame, spaced stocks on the frame, members extending inwardly from the stocks and having valves at their inner ends, heads carried by the members inwardly of the valves and adapted for attachment to a meter, a support on the frame between the heads for a meter, and inlet and discharge pipes connected to said members.

6. A meter tester comprising a supporting frame, spaced stocks on the frame, meter-connecting means between the stocks for connecting a meter between them, a supply pipe leading to one of the stocks, a discharge pipe leading from the opposite stock, and an inlet valve located at the extreme inner end of the said meter-connecting means on the inside of the inlet stock adapted to instantly and completely cut off the flow from the inlet stock.

7. A meter tester comprising a frame, spaced stocks on the frame, meter connecting members extending inwardly from the stocks, valve casings carried on the inner ends of the members, valves in the casings controlling the flow of fluid therethrough, a meter support on the frame between the members, and heads on the inner ends of the valve casings for attachment to the meter.

8. A meter tester comprising a supporting frame, two heads supported on said frame adapted to make connection with a meter placed between them, one of said heads being movable toward and from the other, means for so moving said head, a supply pipe leading to one head, a discharge pipe leading to the other, and an outlet valve of the flop type immediately adjacent the head associated with the discharge pipe and arranged to open away from the head.

9. A meter tester comprising a supporting frame, two heads supported on said frame adapted to make connection with a meter placed between them, one of said heads being movable toward and from the other, means for so moving said head, a supply pipe leading to one head, a discharge pipe leading to the other, a quick operating inlet valve immediately adjacent the supply head, and an outlet valve of the flop type immediately adjacent the discharge head and arranged to open away from the head.

10. A meter tester comprising a supporting frame, spaced stocks mounted on the frame, a meter-connecting head mounted on one of the stocks, a hollow spindle slidable through the opposite stock, a second meter-connecting head mounted on the spindle for movement therewith toward and from the first head, a supply pipe leading to said first stock, and a discharge pipe connected directly and movable with said spindle.

11. A meter tester comprising a supporting frame, a supply pipe on the frame, an inlet head associated therewith, an adjustable clamping spindle opposite said inlet head, a discharge head associated therewith, a stock supporting the inlet head, a stock supporting the clamping spindle and discharge head and having an elongated slot opposite the clamping spindle, and a discharge pipe connected directly to said spindle through said slot and adapted to move with the spindle.

12. A meter tester comprising a supporting frame, a supply pipe on the frame, an inlet head associated therewith, an adjustable clamping spindle opposite said inlet head, a discharge head associated therewith, stocks supporting the clamping spindle and the inlet head respectively, one of said stocks having an elongated slot opposite the clamping spindle and in its upper side, a discharge pipe connected directly to said spindle through said slot and adapted to move with the spindle, and means for draining said slot.

13. A meter tester comprising a supporting frame, two clamping heads on the frame and adapted to make connection with a meter placed between them, a movable clamping spindle supporting one of said heads, said spindle being hollow and open at the head end and closed at its rear end, and means engaging the closed end for adjusting said spindle.

14. A meter tester comprising a supporting frame, two clamping heads on the frame and adapted to make connection with a meter placed between them, a movable clamping spindle supporting one of said heads, said spindle being hollow and having the head end open and its rear end closed by two spaced walls and further having a conduit connecting with the spindle between the open end and the adjacent wall, and means engaging the rearmost wall for moving the spindle.

15. A meter tester comprising a pair of meter-connecting heads, a movable clamping spindle supporting one of said heads, a fixed stock supporting said spindle, means for moving said spindle in the stock, a pipe leading off directly from and being supported on the spindle, and a multiple-cock connected in the pipe and being supported by and movable with the pipe and the spindle.

16. A meter tester comprising a supporting frame, stocks rising from the frame, a fixed head carried by one stock, an adjustable clamping spindle carried by the other stock, said other stock having a slot in one side longitudinally of the spindle, a second head carried by said spindle opposite the first head, spaced transverse walls closing the end of said spindle, said spindle having openings through its body between the transverse walls and communicating with the slot, and a discharge pipe connected with the interior of the spindle and projecting through the slot.

17. A meter tester comprising two clamping heads adapted to make connection with a meter placed between them, an adjustable clamping spindle on which one of said heads is mounted, said spindle being hollow, spaced transverse walls closing the rear end of the spindle, a discharge pipe making connection with the spindle between its open end and the adjacent wall, a fixed support for the spindle, and a screw threaded adjusting screw fixedly journaled on the fixed support and screw threaded through the rearmost wall of the spindle.

18. In a meter tester, a table, spaced inlet and outlet heads arranged above the table and adapted for connection with a meter, a retaining wall upstanding from the edge of the table, an upright member carried through the table between the heads for supporting a meter, and a mound surrounding said member and rising from the table a height substantially equal to the height of the retaining wall.

19. In a meter tester, a table having a retaining wall upstanding from about the edge thereof and having a circular mound rising up centrally therefrom a height substantially equal to the height of the retaining wall, said table further having a drain opening at one side of the mound and a central opening within the mound, a drain pipe leading from the drain opening, and an upright meter-supporting member adjustable through the central opening of the table.

20. A meter tester comprising a frame, spaced stocks rising from the frame, a fixed head mounted on one of the stocks, a movable clamping spindle on the opposite stock, a second head carried on the inner end of the spindle, a supply pipe leading to the first stock, a discharge pipe carried upon and extending from the spindle, and a multiple cock connected in the discharge pipe and adapted for movement therewith and with the spindle.

21. A meter tester comprising a frame, spaced stocks on the frame, a fixed meter-connecting head on one stock, a clamping spindle movable in the other stock, a second meter-connecting head carried on the spindle, a quick closing valve on said first head, a flop valve on said second head, a supply pipe leading into the first stock, a discharge pipe carried on the spindle and movable therewith, and a multiple-cock connected with the discharge pipe and being supported for movement with the same.

22. A meter tester comprising a table, opposed heads spaced apart and arranged above the table, a vertically positioned post screw threaded into the table midway between the heads, a hand-wheel on the post for turning the same to adjust the post vertically, and a meter-supporting platform rotatably mounted on the upper end of the post.

23. A meter tester comprising a frame, spaced stocks rising from the frame, a fixed head on one stock, a movable meter-clamping spindle on the opposite stock, a second head carried on the inner end of the spindle, a supply pipe leading to the first stock, a quick closing valve on said first head, a discharge pipe connected with one side of the spindle and adapted for movement therewith, a multiple-cock connected in said discharge pipe for movement with the spindle, and a quick acting valve carried upon the inner end of the spindle at the second head.

In testimony whereof I have hereunto set my hand in presence of two subscribing witnesses.

PHILIP MUELLER.

Witnesses:
WILLIAM R. BIDDLE,
LEONARD F. MCKIBBEN.